United States Patent [19]
Liu et al.

[11] Patent Number: 6,161,800
[45] Date of Patent: Dec. 19, 2000

[54] PIVOTING SPANWISE-FLOW REDIRECTOR FOR TILTROTOR AIRCRAFT

[75] Inventors: John Liu, Thorton; Michael A. McVeigh, Moylan; Robert J. Mayer, Swarthmore, all of Pa.

[73] Assignee: The Boeing Company, Seattle, Wash.

[21] Appl. No.: 09/304,938

[22] Filed: May 4, 1999

[51] Int. Cl.[7] ................................................. B64C 27/28
[52] U.S. Cl. ......................... 244/7 R; 244/17.19; 244/56; 244/66
[58] Field of Search ............................ 244/6, 7 R, 7 A, 244/7 C, 56, 66, 17.19

[56] References Cited

U.S. PATENT DOCUMENTS

| | | | |
|---|---|---|---|
| 1,052,334 | 2/1913 | Gettys et al. | 244/6 |
| 2,363,129 | 11/1944 | Heitmann | 244/7 R |
| 2,496,083 | 1/1950 | Browning . | |
| 3,544,047 | 12/1970 | Gabriel . | |
| 3,666,209 | 5/1972 | Taylor | 244/12.4 |
| 4,739,957 | 4/1988 | Vess et al. . | |
| 5,236,149 | 8/1993 | MacKay . | |
| 5,240,204 | 8/1993 | Kunz . | |
| 5,437,419 | 8/1995 | Schmitz . | |

OTHER PUBLICATIONS

Michael A. McVeigh, William K. Grauer & David J. Pasiley, "Rotor/Airframe Interactions on Tiltrotor Aircraft," 44th Annual Forum and Technology Display of the American Helicopter Society, Jun. 1988, pp. 43–51, Washington, D.C.

Fort F. Felker, "A Review of Tilt Rotor Download Research," NASA Ames Research Center, Moffett Field, California, U.S.A., Sep. 20–23, 1988, Paper No. 14, pp. 14–1—14–32.

Photograph of XV–15 prototype aircraft circa 1992.

Photograph of XV–15 prototype aircraft (side elevational view) circa 1992.

M. Peryea and T.L. Wood, "Reduction of Tiltrotor Download," Bell Helicopter Textron, Oct. 15, 1992, pp. 1–7.

T.L. Wood and M.A. Peryea, "Reduction of Tiltrotor Download," American Helicopter Society 49th Annual Forum, St. Louis, Mo., May 19–21, 1993.

D.G. Sigl and T.L. Wood, "Improved Understanding of Tiltrotor Download," undated.

*Primary Examiner*—Michael J. Carone
*Assistant Examiner*—James S. Bergin
*Attorney, Agent, or Firm*—Brooks & Kushman P.C.

[57] ABSTRACT

A tiltrotor aircraft includes a spanwise-flow redirector having a pair of flow-redirection panels respectively mounted on the aircraft's mid-fuselage area for rotation about a panel pivot axis between a stowed position and a deployed position. In the stowed position, each panel is substantially flush with an adjacent surface of the mid-fuselage area. In the deployed position, each panel is raised into the path of one of the inbound spanwise flows generated by the aircraft's rotors during hover operation, whereupon each panel redirects the respective one of the inbound spanwise flows either forward or aft of the other inbound spanwise flow. In this manner, the deployed panels prevent stagnation of the inbound spanwise flow atop the mid-fuselage area while further serving to minimize re-ingestion of merged spanwise flow into the rotors, resulting in decreased airframe download forces, increased rotor thrust, and reduced noise levels during hover operation.

21 Claims, 2 Drawing Sheets

PIVOTING SPANWISE-FLOW REDIRECTOR FOR TILTROTOR AIRCRAFT

STATEMENT AS TO RIGHTS TO INVENTIONS MADE UNDER FEDERALLY-SPONSORED RESEARCH AND DEVELOPMENT

The invention was made with Government support under Advanced Rotorcraft Technology Contract No. NCCW-0076. The Government has certain rights to the invention.

FIELD OF THE INVENTION

The invention relates to apparatus for reducing airframe download forces and recirculated flow associated with operation of a tiltrotor aircraft's driven rotors in the hover position.

BACKGROUND INFORMATION

The prior art has generally recognized a ten- to twenty-percent reduction in the gross weight capability of tiltrotor aircraft due to rotor-airframe flowfield interactions when the aircraft's engines are rotated into the hover position. More specifically, when the rotors are operated in the hover position, a portion of the rotor downwash from each wing-mounted rotor impinges upon the upper surface of the respective wing and is redirected spanwise along the wing's upper surface toward the mid-fuselage area separating the aircraft's wings. The inbound spanwise flows merge together to thereby increase static pressure above the mid-fuselage area and, hence, add a download force on the airframe. Moreover, a portion of the merged flow rises up above the airframe, only to be re-ingested by the rotors, thereby further reducing rotor efficiency while substantially increasing rotor noise. This latter effect is often referred to as the "fountain effect," with the recirculating flow being referred to as "fountain flow."

In response, the prior art teaches the use of wing-mounted "chordwise" structures, such as fences, plows, and slanted scoops, to redirect each inbound spanwise flow both forward and aft of the aircraft's mid-fuselage area. A typical characteristic of such prior art fences, plows, and scoops, is that a portion of the inbound spanwise flow stagnates at the base of the fence, plow or scoop. Such stagnated flow, in turn, generates increased static pressure along the wing's upper surface, thereby increasing download forces on the airframe.

Further, each prior art chordwise structure (typically deployed in pairs, one atop each wing) treats each spanwise flow in a "symmetrical" manner, i.e., one wing's chordwise structure defines a mirror-image of the other wing's chordwise structure about a vertical reference plane passing through a centerline axis of the fuselage. As a result, to the extent that the chordwise structures horizontally redirect each spanwise flow over the upper surfaces of the aircraft, the flows are redirected in a symmetrical manner fore and aft of the mid-fuselage area, thereby resulting in only a modest reduction in spanwise-flow-related download force.

SUMMARY OF INVENTION

A spanwise-flow redirector and operating method for a tiltrotor aircraft, the wing-mounted driven rotors of which respectively generate, during hover operation of the aircraft, a first spanwise flow toward the aircraft's mid-fulselage area over one wing and a second spanwise flow toward the mid-fuselage area over the other wing, includes at least one panel and, preferably, at least two panels mounted on the aircraft's mid-fuselage area and/or wings for pivotal movement about a respective panel pivot axis, with each panel pivot axis forming a respective first acute angle with a vertical reference plane containing the centerline axis of the fuselage. Under the invention, the first or "stowed" position for each panel is characterized in that the panel is substantially flush with an adjacent surface of the wing and/or mid-fuselage area. The second or "deployed" position is characterized in that each panel projects above the adjacent surface of the wing and/or mid-fuselage area to substantially redirect the first spanwise flow generally forward of the second spanwise flow while substantially redirecting the second spanwise flow generally aft of the first spanwise flow.

In accordance with a feature of the invention, the flow redirector increases hover performance by reducing fuselage download and the fountain effect. Specifically, the substantial redirection of the spanwise flows in the manner described above significantly reduces the amount of spanwise flow stagnation proximate to the mid-fuselage area. As a result, static pressure at the mid-fuselage area and, hence, airframe download forces are both significantly reduced. The flow redirector also helps to reduce the strength of the fountain region by significantly reducing the amount of re-ingestion of the merged spanwise flow, which further improves rotor hover performance. An important additional benefit of the invention is a significant reduction in rotor noise during hover operation of the aircraft.

DETAILED DESCRIPTION OF THE INVENTION

Figure 1:
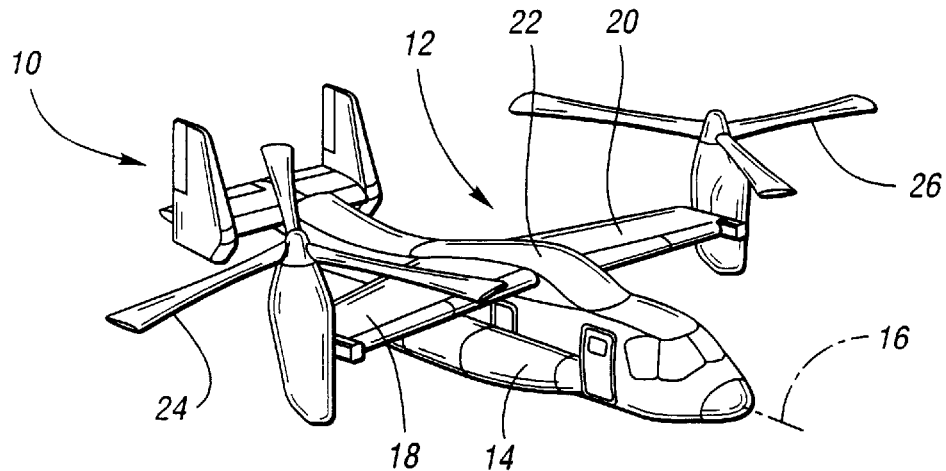
FIG. 1 is a perspective view of a tiltrotor aircraft featuring an exemplary spanwise-flow redirector in accordance with the invention, with the aircraft's wing-mounted rotors illustrated in the hover position.

Referring to the Drawings, a tiltrotor aircraft 10 incorporating an exemplary spanwise-flow redirector 12 in accordance with the invention is generally illustrated in FIG. 1. The aircraft 10 generally includes a fuselage 14 having a centerline axis 16, a pair of generally-oppositely-extending, forward-swept wings 18,20 on the fuselage 14 separated by a mid-fuselage area 22, and a pair of driven rotors 24,26 respectively mounted for rotation on the wings 18,20 between a forward-flight position and a hover position (the driven rotors 24,26 being illustrated in the hover position in FIG. 1). Each wing 18,20 also includes a trailing-edge flap 28 which pivots about a flap hinge axis 30 between an undeflected position (as seen in FIG. 2) and a deflected position (as seen in FIG. 3).

Figure 2:
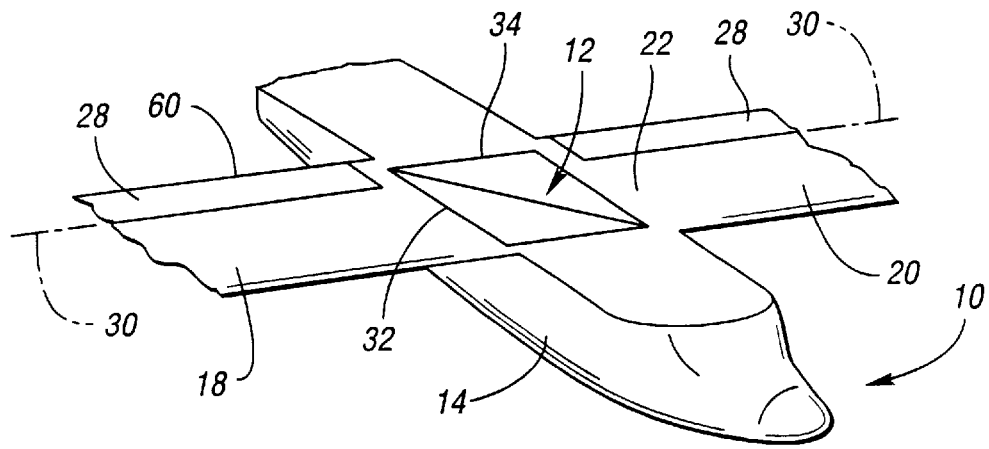
FIG. 2 is an enlarged partial view in perspective of the mid-fulselage area of the aircraft shown in FIG. 1, with the flow-redirecting panels illustrated in the lowered or "stowed" position substantially flush with adjacent surfaces of the mid-fuselage area.
Figure 3:
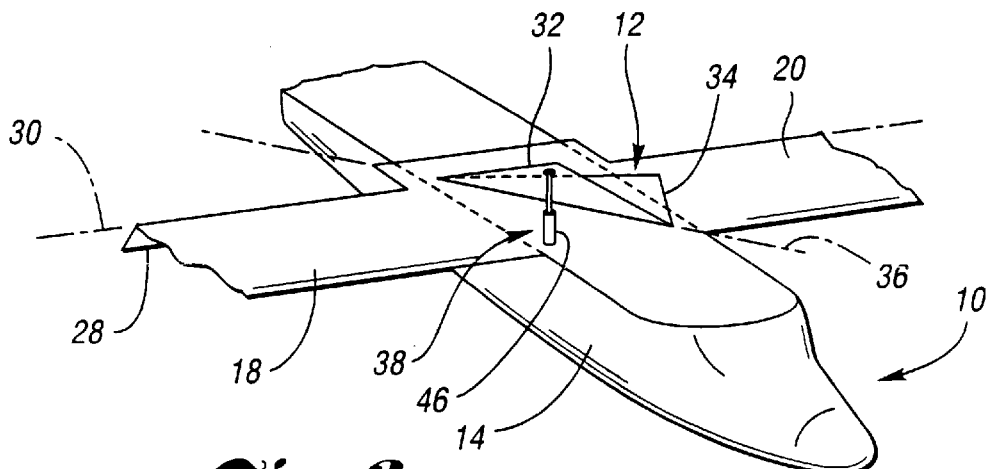
FIG. 3 is an enlarged partial view in perspective of the mid-fulselage area similar to that of FIG. 2, with the spanwise-flow redirector's pivotable flow-redirecting panels illustrated in the raised or "deployed" position.
Figure 6:
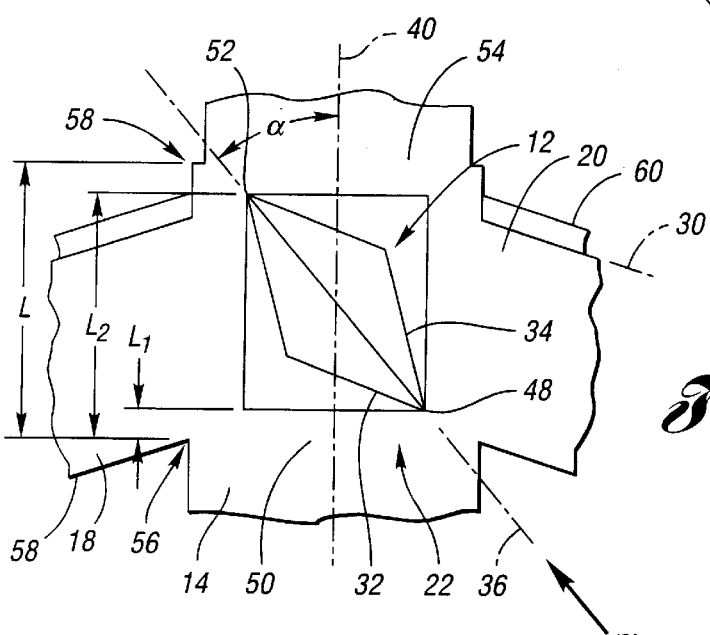
FIG. 6 is an enlarged partial top plan view of the mid-fuselage area of FIG. 2, further illustrating the basic geometries of the exemplary spanwise-flow redirector, in accordance with the invention.

Referring to FIGS. 2–7, the spanwise-flow redirector 12 includes a pair of panels 32,34 which are pivotably mounted on the aircraft's mid-fuselage area 22 using a series of hinges (not shown). Each panel 32,34 is pivotable about a respective panel pivot axis 36 under the control of the aircraft's flight control system 38 between a first, "stowed" position (as illustrated in FIG. 2) and a second, "deployed" position (as best illustrated in FIGS. 3–7). As best illustrated in FIG. 6, the pivot axis 36 for each panel 32,34 forms a respective first acute angle α with respect to a vertical reference plane 40 containing the centerline axis 16 of the fuselage 14. In this manner, the pivot axis for each panel may be said to be "asymmetrical" with respect to the vertical reference plane 40.

In a constructed embodiment, the first panel's pivot axis 36 is collinear with the second panel's pivot axis 36, as seen in FIG. 6. However, the invention contemplates use of any suitable, discrete pivot axis 36 for each panel 32,34 which serves to redirect one inbound spanwise flow 42 either forward or aft of the other inbound spanwise flow 44, in the manner described more fully below. The use of parallel or collinear pivot axes 36 advantageously permits both panels 32,34 to be disposed atop the mid-fuselage area 22, thereby providing greater flexibility, for example, in placement of suitable actuators 46 for moving each panel 32,34 between the stowed position and the deployed position.

In accordance with another feature of the invention, the apex of each panel 32,34 preferably runs diagonally on the mid-fuselage area 22 from a first point 48 on the forward portion 50 of the mid-fuselage area 22 proximate to one wing 20 to a second point 52 on the aft portion 54 of the mid-fuselage area 22 proximate to the other wing 18. More specifically, as best seen in FIG. 6, in a constructed embodiment, the first point 48 on the mid-fuselage area 22 is aft of an aft-most portion 56 of the leading edge 58 of each wing 18,20 and, preferably, is aft of each wing's aft-most leading-edge portion 56 by a first distance $L_1$ no greater than about ten percent of the wing's maximum root chord length L.

And, in the constructed embodiment, the second point 52 on the mid-fulselage area 22 is aft of each wing's aft-most leading-edge portion 56 by a second distance $L_2$ greater than about seventy-five percent of the wing's maximum root chord length L. Most preferably, the second point 52 on the mid-fuselage area 22 is aft of the flap hinge axis 30 and forward of the aft-most portion 58 of the flap's trailing edge 60 when the flap 28 is in the undeflected position.

As stated above, each panel 32,34 is pivotable under the control of the aircraft's flight control system between a stowed position and a deployed position. More specifically, the stowed position for each panel 32,34 is characterized in that the panel's upper surface 62 defines an aerodynamically-contoured portion of the mid-fuselage area 22 that is substantially flush with adjacent surface portions 64 of the mid-fuselage area 22. In this manner, the stowed position for each panel 32,34 is said to be "substantially flush" with the mid-fuselage area 22.

Figure 4:
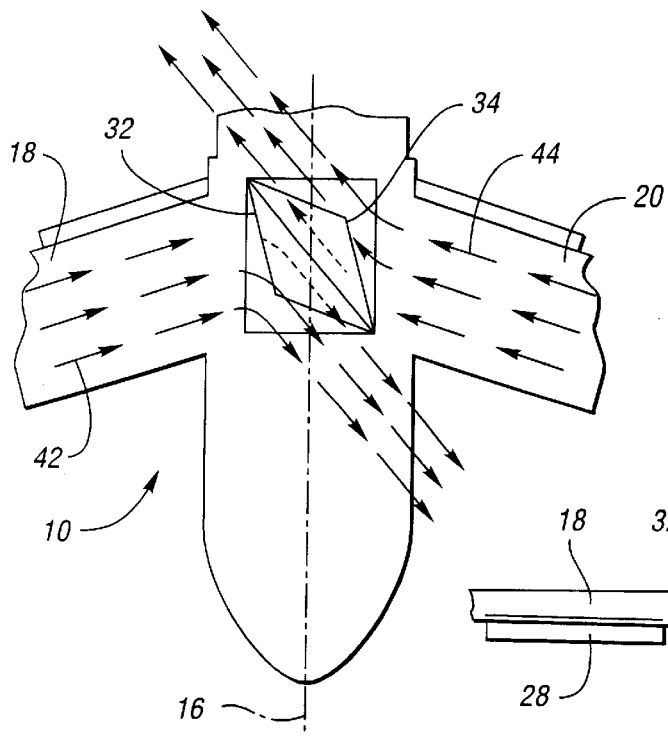
FIG. 4 is a partial view in perspective of the aircraft's wings and mid-fuselage area that diagrammatically illustrates the spanwise flows as redirected by the deployed panels.
Figure 5:
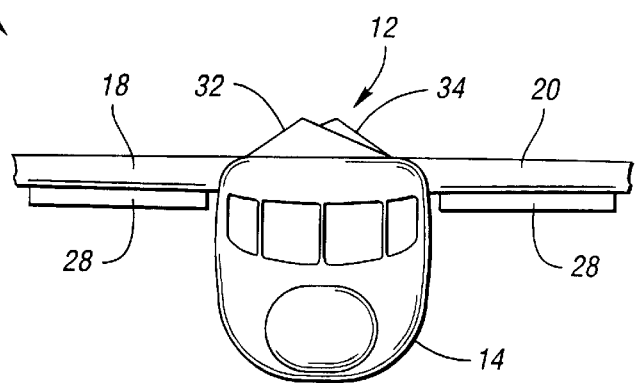
FIG. 5 is a partial front elevational view of the aircraft illustrating the spanwise-flow redirector's pivotable flow-redirecting panels in the deployed position.

As best seen in FIG. 4, the deployed position for each panel 32,34 is characterized in that each panel's lower surface 66 is raised into the path of one of the spanwise flows 42,44 generated during aircraft hover operation such that, during hover operation of the aircraft 10, one panel 32 substantially redirects the first spanwise flow 42 generally forward of the second spanwise flow 44 while the second panel 34 substantially redirects the second spanwise flow 44 generally aft of the first spanwise flow 42. In the context of the invention, "generally forward" and "generally aft" are intended to be broadly construed and, hence, expressly do not require that either flow 42,44 be redirected into alignment with the centerline axis 16 of the fuselage 14. The invention thus substantially reduces possibility of the deleterious merger of the two inbound spanwise flows 42,44 over the mid-fuselage area 22 by "asymmetrically" redirecting the flows 42,44 relative to a vertical reference plane 40 containing the fuselage's centerline axis 16 such that each redirected spanwise flow 42,44 passes to one "side" of the other.

It is noted that, for tiltrotor aircraft 10 equipped with trailing-edge wing flaps 28, the flaps 28 are preferably simultaneously deployed with the panels 32,34 to a deflected position during hover operation of the aircraft 10. The deflected flaps 28 reduce the wing surface area projecting through each rotor downwash and, hence, reduce the volume of spanwise flow 42,44 developed during hover operation that would otherwise be further redirected by the deployed panels 32,34 of the exemplary spanwise-flow redirector 12.

In accordance with yet another feature of the invention, the aircraft's flight control system 38 operates to lower the panels 32,34 upon transitioning from hover operation to forward-flight operation when aircraft airspeed exceeds a predetermined threshold airspeed. By way of example only, in a constructed embodiment, the predetermined threshold airspeed at which the panels 32,34 are completely lowered to the stowed position is about 40 knots. It will be appreciated that the predetermined threshold airspeed is preferably selected in relation to such factors, for example, as the aerodynamic lift generated by the aircraft's wings 18,20, and the increased aerodynamic drag in forward flight of the panels 32,34 when the latter are in the deployed position. Preferably, the panels 32,34 are gradually lowered from the deployed position to the stowed position as forward-flight airspeed approaches the predetermined threshold airspeed.

Figure 7:
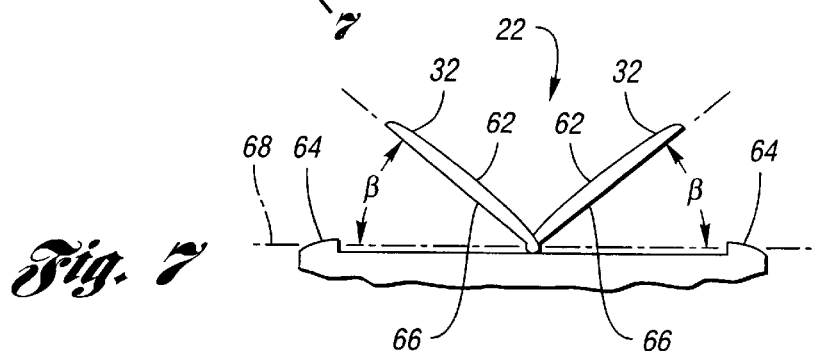
FIG. 7 is a partial elevational view of the mid-fuselage area taken along the pivot axis of each panel and illustrating the disposition of the lower surfaces of the deployed panels relative to a horizontal reference plane.

As a further feature of the invention, when each panel 32,34 is raised to the deployed position, the flow-redirecting lower surface 66 of each panel 32,34 preferably forms an acute deployment angle, with a horizontal reference plane 68, as best illustrated in FIG. 7. In a constructed embodiment, the deployment angle β is preferably greater than about thirty degrees, while the deployment angle β is preferably less than about sixty degrees. When deployed at the deployment angle β, the panel's flow-redirecting lower surface 66 further reduces the amount of spanwise flow 42,44 which might otherwise rise above the panel 32,34, merge with a rising amount of the opposite spanwise flow 44,42, and be re-ingested by one of the rotors 24,26.

In the foregoing manner, the invention reduces the two primary rotor-airframe flowfield interactions of the fuselage download force and re-circulating (fountain) flow over the mid-fuselage area 22, thereby providing increased hover performance including increased payload, increased range and/or increased weight-empty allowances. Moreover, in the constructed embodiment, rotor noise during hover operation of the aircraft was observed to be reduced by more than 5 dB.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention. For example, under the invention, the panels 32,34 can extend from the forward right corner to the art left corner of the mid-fuselage area 22, or, alternatively, from the forward left corner to the art right corner of the mid-fuselage area 22. Each configuration is believed to be equally effective in redirecting the inbound spanwise flows 42,44 in the manner described above, thereby avoiding the deleterious merging of the inbound spanwise flows 42,44 which results in increased download force, decreased generated lift and increased noise. Similarly, while the exemplary flow redirector 12 described above employs panels 32,34 of generally triangular shape to facilitate redirector packaging atop the mid-fuselage area 22, the invention contemplates panels 32,34 of other configuration, including but not limited to panels of trapezoidal, square, rectangular and polygonal shape.

What is claimed is:

1. In a tiltrotor aircraft including a fuselage having a centerline axis, a pair of generally-oppositely-extending wings on the fuselage separated by a mid-fulselage area, and a driven rotor mounted on each wing for rotation between a forward-flight position and a hover position, and wherein the driven rotors in the hover position generate a first spanwise flow toward the mid-fuselage area over one of the wings and a second spanwise flow toward the mid-fuselage area over another of the wings, the improvement comprising a spanwise-flow redirector including:

at least one panel mounted on the aircraft for pivotal movement about a respective panel pivot axis between a first position and a second position, each panel pivot axis forming a respective first acute angle with a vertical reference plane containing the centerline axis of the fuselage;

wherein the first position is characterized in that the at least one panel is substantially flush with an adjacent surface of at least one of the group consisting of a wing and the mid-fuselage area; and wherein the second position is characterized in that the at least one panel projects above the adjacent surface of the at least one of the group consisting of the wing and the mid-fuselage area to substantially redirect the first spanwise flow generally forward of the second spanwise flow while substantially redirecting the second spanwise flow generally aft of the first spanwise flow.

2. The tiltrotor aircraft of claim 1, wherein the flow redirector includes a first panel and a second panel, and wherein the respective second positions for the first and second panels are characterized in that the first panel redirects the first spanwise flow and the second panel redirects the second spanwise flow.

3. The tiltrotor aircraft of claim 2, wherein each panel has a flow-redirecting surface, and wherein the second position is further characterized in that the flow-redirecting surface of each panel forms a respective second acute angle with a horizontal reference plane.

4. The tiltrotor aircraft of claim 3, wherein second acute angle is no greater than about 60 degrees.

5. The tiltrotor aircraft of claim 3, wherein the second acute angle is no less than about 30 degrees.

6. The tiltrotor aircraft of claim 2, wherein the first panel and the second panel are positioned side-by-side atop the mid-fuselage area.

7. The tiltrotor aircraft of claim 6, wherein the first and second panel pivot axes are collinear.

8. The tiltrotor aircraft of claim 1, wherein each of the at least one panels extends forward on the aircraft to a first point which is aft of an aft-most portion of a leading edge of one wing.

9. The tiltrotor aircraft of claim 8, wherein the first point is aft of the forward-most leading edge by no greater than about ten percent of the maximum root chord length of the one wing.

10. The tiltrotor aircraft of claim 8, wherein each of the at least one panels extends afterward on the aircraft to a second point which is aft of the aft-most portion of the leading edge by at least about seventy-five percent of the maximum root chord length of the one wing.

11. The tiltrotor aircraft of claim 10, wherein the one wing includes a flap pivoting about a flap hinge axis between an undeflected position and a deflected position; and wherein the second point is aft of the flap hinge axis and forward of an aft-most portion of a trailing edge of the flap when the flap is in the undeflected position.

12. A flow redirector adapted for use in a tiltrotor aircraft, wherein the aircraft includes a fuselage having a centerline axis, a pair of generally-oppositely-extending wings on the fuselage separated by a mid-fuselage area, and a driven rotor mounted on each wing for rotation between a forward-flight position and a hover position, and wherein the driven rotors in the hover position generate a first spanwise flow toward the mid-fuselage area over one of the wings and a second spanwise flow toward the mid-fuselage area over another of the wings, the flow redirector comprising:

a first panel mounted on one of the fuselage and one wing for pivotal movement about a first panel pivot axis between a first position, wherein the first panel is substantially flush with at least one of the fuselage and an upper surface of the one wing, and a second position, wherein a surface of the first panel substantially redirects spanwise flow over the one wing generally forward of spanwise flow over the other wing;

a second panel mounted on one of the fuselage and the other wing for pivotal movement about a second panel pivot axis between a first position, wherein the second panel is substantially flush with at least one of the fuselage and an upper surface of the other wing, and a second position, wherein a surface of the second panel substantially redirects spanwise flow over the other wing generally aft of spanwise flow over the one wing; and wherein the first panel pivot axis forms a first acute angle with a vertical reference plane containing the centerline axis of the fuselage, and the second panel pivot axis forms a second acute angle with a vertical reference plane containing the centerline axis of the fuselage.

13. The flow redirector of claim 12, wherein each panel has a flow-redirecting surface, and wherein the second position for each panel is further characterized in that the flow-redirecting surface of each panel forms a respective third acute angle with a horizontal reference plane.

14. The flow redirector of claim 13, wherein the third acute angle is no greater than about 60 degrees.

15. The tiltrotor aircraft of claim 13, wherein the third acute angle is no less than about 30 degrees.

16. The tiltrotor aircraft of claim 12, wherein the first panel and the second panel are positioned side-by-side atop the mid-fuselage area.

17. The tiltrotor aircraft of claim 16, wherein the first and second panel pivot axes are collinear.

18. A method for operating a tiltrotor aircraft, wherein the aircraft includes a fuselage having a centerline axis, a pair of generally-oppositely-extending wings on the fuselage separated by a mid-fuselage area, and a pair of driven rotors respectively mounted on each of a pair of wings for rotation between a forward-flight position and a hover position, and wherein the driven rotors in the hover position generate a first spanwise flow toward the mid-fuselage area over one of the wings and a second spanwise flow toward the mid-fuselage area over another of the wings, the method including:

controllably raising at least one panel, mounted on at least one of the group consisting of the fuselage, the one wing and the other wing, from a stowed position to a deployed position, wherein the stowed position is characterized in that the at least one panel is substantially flush with an adjacent surface of at least one of the group consisting of the fuselage, the one wing and the other wing, and wherein the deployed position is characterized in that the at least one panel substantially redirects the first spanwise flow generally forward of the second spanwise flow while substantially redirecting the second spanwise flow generally aft of the first spanwise flow.

19. The method of claim 18, wherein controllably raising the at least one panel includes pivoting the at least one panel about a respective panel pivot axis between the first position and the second position, and wherein each panel pivot axis forms a respective first acute angle with a vertical reference plane containing the centerline axis of the fuselage.

20. The method of claim 18, further including lowering the at least one raised panel when the aircraft achieves an airspeed in forward flight greater than a predetermined threshold airspeed.

21. The method of claim 20, wherein the predetermined threshold airspeed is about 40 knots.

* * * * *